United States Patent

Vukovich et al.

[11] Patent Number: 5,857,162
[45] Date of Patent: Jan. 5, 1999

[54] AUTOMATIC TRANSMISSION HOT MODE MANAGEMENT

[75] Inventors: William Joseph Vukovich, Ypsilanti; Melissa Mei Koenig, Ann Arbor, both of Mich.

[73] Assignee: General Motors Corporation, Detroit, Mich.

[21] Appl. No.: 497,026

[22] Filed: Jun. 30, 1995

[51] Int. Cl.[6] .................................................. G06G 7/70
[52] U.S. Cl. ................................ 701/62; 701/51; 701/65; 477/98; 477/65
[58] Field of Search ........................ 364/424.08–424.085, 364/424.09–424.094; 477/76, 78, 97, 65, 176, 98, 64, 60, 156, 158, 175, 75, 62; 192/3.3, 3.31; 73/118.1, 53.07; 123/41.1, 41.33; 374/103, 141, 27; 701/51, 58, 60, 61, 62

[56] References Cited

U.S. PATENT DOCUMENTS

| | | | |
|---|---|---|---|
| 4,319,483 | 3/1982 | Durham, Jr. et al. | 73/204.15 |
| 4,545,334 | 10/1985 | Nakagawa et al. | 123/41.33 |
| 4,733,581 | 3/1988 | Hasegawa et al. | 477/98 |
| 4,869,596 | 9/1989 | Klein et al. | 374/27 |
| 4,954,973 | 9/1990 | Jacob et al. | 364/551.01 |
| 5,050,717 | 9/1991 | Shibayama | 477/64 |
| 5,051,562 | 9/1991 | Bailey et al. | 219/506 |
| 5,069,084 | 12/1991 | Matsuno et al. | 477/61 |
| 5,128,517 | 7/1992 | Bailey et al. | 209/506 |
| 5,310,033 | 5/1994 | Shibayama | 192/3.29 |
| 5,319,963 | 6/1994 | Benford | 73/118.1 |
| 5,347,885 | 9/1994 | Taga et al. | 477/75 |
| 5,518,468 | 5/1996 | Sametz et al. | 477/156 |
| 5,556,349 | 9/1996 | Ishii et al. | 477/76 |

FOREIGN PATENT DOCUMENTS

| | | |
|---|---|---|
| 0532364 A2 | 3/1993 | European Pat. Off. . |
| 0526803 A2 | 9/1993 | European Pat. Off. . |

*Primary Examiner*—Jacques H. Louis-Jacques
*Attorney, Agent, or Firm*—Vincent A. Cichosz

[57] ABSTRACT

A multi-ratio automatic transmission has a plurality of fluid operated clutching devices, a fluidic torque converter and a fluid operated torque converter clutch mechanism. During certain operational periods, a hot mode is invoked to eliminate certain heat sources and increase heat dissipation to thereby prevent the fluid temperature from exceeding a predetermined maximum temperature. The hot mode is invoked as a function of both the temperature of the transmission fluid and the rate of change of the fluid temperature.

6 Claims, 3 Drawing Sheets

AUTOMATIC TRANSMISSION HOT MODE MANAGEMENT

BACKGROUND

This invention is related to computer controlled automatic transmissions. More particularly, the invention is concerned with a method used to determine the propriety of operating the transmission in what is known in the art of transmission controls as 'hot mode'.

During certain vehicle operating conditions, transmission fluid temperatures can reach and exceed undesirable levels leading to fluid degradation and performance deterioration. In such situations, it is desirable and well known to take steps to prevent excessive temperatures by providing a hot mode of operation wherein various control actions are taken to decrease heat sources and/or improve heat dissipation. Generally, this involves application of the torque converter clutch to eliminate the major heat source, that being the characteristic losses of fluid coupling, and/or extending the shift points thereby increasing engine rpm and proportionally increasing transmission fluid flow through the transmission including the cooler lines.

Typically, entry into a hot mode is triggered by the transmission fluid temperature exceeding a predetermined threshold. The threshold is a compromise among many factors including undesirable peak fluid temperatures with high threshold calibrations, frequent and/or lengthy hot mode duration with low threshold calibrations, and mode cycling busyness.

SUMMARY

Therefore, the present invention seeks to provide a method for controlling entry into a hot mode of operation in a multi-ratio automatic transmission which reduces total time spent in hot mode, and reduces unnecessary hot mode invocation and cycling between normal and hot modes of operation. The transmission includes a plurality of fluid operated friction elements, a fluidic torque converter and a fluid operated torque converter lock-up clutch.

Fluid temperature monitored for example at the sump is used to predict the propriety of entering a hot mode of operation of the transmission. The method employed recognizes that hot mode entry may be desirable at lower temperature when the rate of increase thereof indicates the likelihood that a maximum desirable temperature will be reached, and possibly exceeded, unless corrective action is taken. It also recognizes that the hot mode may not be desirable at upper temperatures when the rate of increase thereof is indicates a likelihood that a maximum desirable temperature will not be reached immediately.

The temperature of the fluid monitored for the purpose of determining the temperature and the time rate of change of the temperature. A reference rate of change is looked-up as a function of the present temperature and the time rate of change of the fluid temperature is compared thereto. The hot mode is not invoked unless the rate of change in the fluid temperature exceeds the reference rate.

Additionally, the rate reference may be adapted in response to the temperature differential between the peak fluid temperature during hot mode The hot mode of operation is exited when the fluid temperature falls below an exit temperature determined as a function of the fluid temperature at which the hot mode was invoked to provide for a degree of hysterisis and preventing cycling between modes. A timer may also be implemented to ensure that sufficient separation between invocation and exit does not appear as busyness to the vehicle operator.

DETAILED DESCRIPTION

Figure 1:
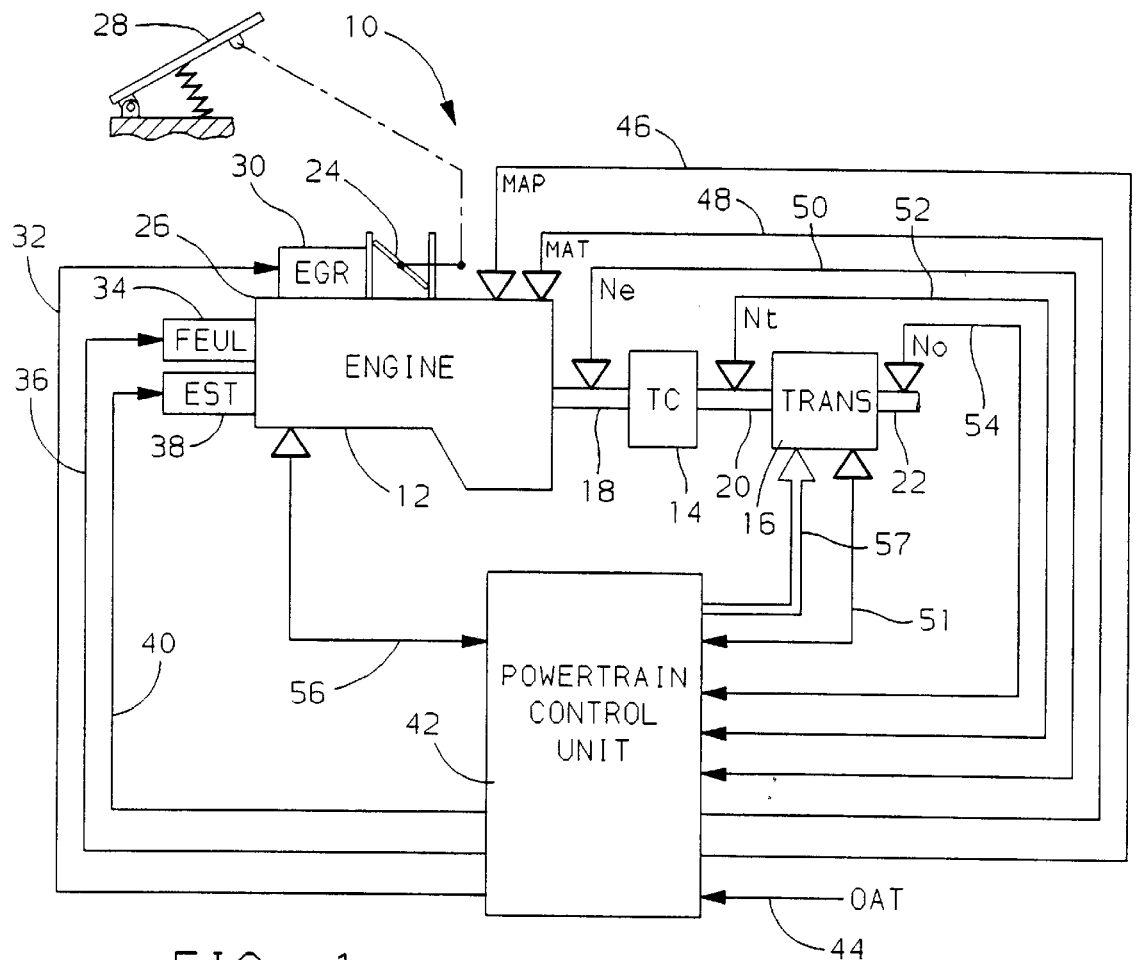
FIG. 1 is a schematic illustration of a conventional computer controlled powertrain system for implementing the hot mode management of the present invention.

Referring to FIG. 1, the reference numeral 10 generally designates a motor vehicle drivetrain comprising a spark ignition internal combustion engine (ENGINE) 12, a fluidic torque converter (TC) 14 and a conventional hydraulic automatic transmission (TRANS) 16. The engine output shaft 18 drives the input member (impeller) of torque converter 14, the output member (turbine) of torque converter 14 drives the transmission input shaft 20, and the transmission output shaft 22 drives the vehicle wheels for propelling the vehicle.

A throttle 24 controls the ingestion of combustion air through the engine intake manifold, schematically designated by the reference numeral 26. The throttle 24 is positioned in a conventional manner by an operator manipulated accelerator pedal 28, as indicated. An exhaust gas recirculation (EGR) actuator 30 additionally returns a controlled amount of the exhaust gases to the manifold 26 in accordance with an EGR control signal on line 32. Engine fueling is controlled by a conventional fuel injection apparatus generally designated by the reference numeral 34 in accordance with a fuel pulse width signal on line 36.

The engine ignition function is carried out with a conventional spark ignition system (not illustrated) which cooperates with a conventional electronic spark timing (EST) unit 38 to initiate combustion in the various engine cylinders in accordance with a predetermined schedule. The EST unit 38 typically schedules the spark timing as a predetermined function of engine speed and manifold absolute pressure (MAP), and modifies the scheduled timing in accordance with spark retard commands, if any, present on line 40.

The EGR control signal, the fuel pulse width signal, and the spark timing signal are generated by a computer based powertrain control unit 42 in a predetermined manner in accordance with various operating parameters of the drivetrain 10. Such parameters are sensed with conventional transducers and provided as inputs to control unit 42 via lines 44–56. The sensed powertrain control parameters may include the outside air temperature (OAT) on line 44, the manifold absolute pressure (MAP) on line 46, the manifold air temperature (MAT) on line 48, the engine speed (Ne) on line 50, the transmission fluid temperature on line 51, the torque converter output (turbine) speed (Nt) on line 52, the transmission output shaft (No) on line 54, and the engine coolant temperature (Ct) on line 56. The control unit 42 may be mechanized with a conventional state-of-the-art microcomputer controller, including a central processing unit, memory and input/output devices.

Transmission 16 has a plurality of conventional fluid operated friction devices for engaging various gear elements to provide for a variety of speed ratios generally characterized by the ratio of the turbine speed Nt to transmission output shaft speed No, or Nt/No. Additionally, the torque converter 14 has associated therewith a friction clutch (TCC) engageable to selectively mechanically couple the input member (impeller) thereof to the output member (turbine) thereof. A controlled shift pressure for sourcing pressurized fluid to the various friction devices is typically established by a solenoid controlled fluid valve (force motor) in accordance with a pulse width signal. The same force motor is typically responsible for establishing the line pressure also. References to establishing line pressure and shift pressure, therefor, may be interchangeably used herein. Fluid pressure for the various friction devices are typically established by solenoid controlled fluid valves (shift valves) in accordance with the supplied line pressure and other hydraulic devices such as accumulators and restrictors. Another solenoid controlled fluid valve, itself responsive to a pulse width signal, provides fluid pressure to various hydraulic valves to control the state of the TCC in accordance with fluid pressure differential between an apply chamber and a release chamber in a conventional manner. The various solenoid control pulse width signals, generally designated by the numeral 57 in the illustration, are also generated by the powertrain control unit 42 in a predetermined manner in accordance with various operating parameters of the drivetrain 10.

Figure 2:
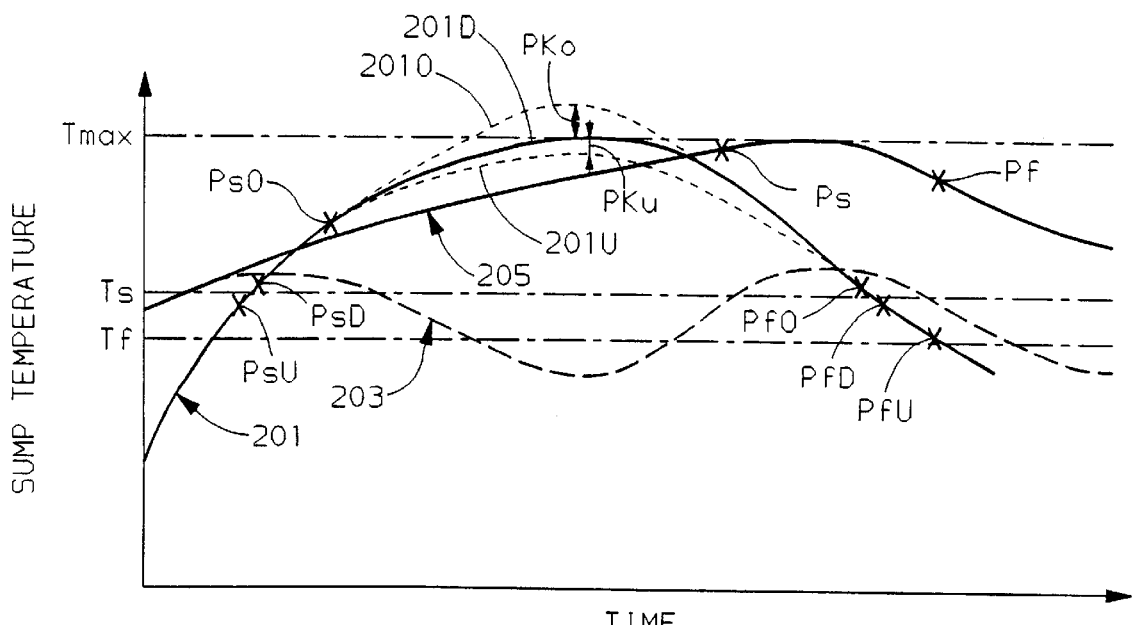
FIG. 2 illustrates various transmission fluid temperature response curves corresponding to hot mode management in accordance with conventional methodology and the methodology of the present invention in accordance with a preferred implementation thereof.

Referring now to FIG. 2, transmission fluid temperature is plotted along the vertical axis as transmission sump temperature. The transmission sump is a conventionally chosen transmission location at which to sample transmission fluid temperature by conventional sensing means as shown in FIG. 1. Time is plotted along the horizontal axis. Conventional hot mode management utilizes a hot mode entry, or start, threshold such as Ts in the figure. Additionally, conventional practice utilizes a hot mode exit, or finish, threshold such as Tf in the figure. Ts represents a greater temperature than Tf represents to essentially provide for a degree of hysteresis thereby preventing undesirable cycling into and out of the hot mode. The upper horizontal line labeled at a temperature level Tmax represents a maximum desirable temperature and one which the temperature of the fluid should not be allowed to exceed.

Assuming vehicle operating conditions exhibiting a characteristic fluid temperature increase as shown in trace 201 prior to start temperature Ts, hot mode would be entered upon trace 201 crossing Ts. Immediately after entry into hot mode, the temperature continues to climb due to various factors including continued heat transfer from clutches and lag time associated with fluid travel to the sump. Depending upon the calibration point of Ts, several general scenarios develop. In one case, the entry at the calibrated threshold Ts may result in a peak temperature overshoot of the fluid temperature beyond Tmax as shown in path 201O, which event is most undesirable. In another case, the entry at the calibrated threshold Ts may result in a peak temperature which undershoots Tmax as shown in path 201U. While path 201U is satisfactory from the standpoint of managing the peak temperature below Tmax, it represents an opportunity for reducing the time in hot mode if a higher start threshold were to be used. The path 201D is the most desirable path for the specific operating conditions as it shows fluid temperature reaching yet not exceeding Tmax . As can be inferred from the various scenarios, decreasing the threshold Ts may advantageously result in no peak temperature overshoot, however, may disadvantageously results in increased time in hot mode. Increasing the threshold Ts on the other hand may reduce the time in hot mode but increase the probability of peak temperature exceeding Tmax, especially at more severe transmission operating conditions (i.e greater heat input). Additionally, entry threshold lowering may cause undesirable entry into hot mode and objectionable cycling between modes. Assuming vehicle operating conditions exhibiting a characteristic fluid temperature increase as shown in trace 205 prior to start temperature Ts, entry into hot mode in accordance with a threshold Ts which may be appropriate for other operating conditions such as embodied in trace 201 may indeed present undesirable cycling as illustrated by path 203. In path 203, the invocation of hot mode swiftly manages the fluid heat rise and brings the temperature thereof below the exit threshold Tf only to repeat the entry/exit sequence where the operating conditions persist. The foregoing is illustrative of the various shortcomings of static thresholds as practiced in conventional hot mode management.

The present invention on the other hand applies a dynamic threshold as a function of fluid temperature and the time rate of change of fluid temperature. Additionally, in a preferred implementation, an adaptive function provides threshold correction as a function of peak fluid temperature error relative a maximum desired temperature thereby supplementing calibrated thresholds. As an example, using the trace 201 in FIG. 2, fluid temperature is sampled as time progresses and the time rate of change of fluid temperature is also determined. Entry into hot mode is established when the rate of fluid temperature increase exceeds a predetermined rate corresponding to the present temperature. In the present example, a desired predictive hot mode entry, or start, point is labeled PsD and would result in continuation along path 201D. While the rates of fluid temperature increases prior to that at point PsD may actually be equivalent to or greater than that at point PsD, such rates in the exemplary trace do not invoke the hot mode since the predetermined rates corresponding to the respective temperatures are not exceeded.

In general, higher rates of fluid temperature change will invoke hot mode at lower fluid temperatures while lower rates of fluid temperature change will invoke hot mode at higher fluid temperatures. The former relationship can be seen in the trace 201 and corresponding desired hot mode start point labeled PsD, and the latter relationship can be seen in the trace 205 and corresponding hot mode start point labeled Ps. Also noted here are the respective hot mode exit points PfD and Pf corresponding to traces 201 and 205 respectively. These points are seen to be below the temperature at which hot mode was invoked. Additionally, though not illustrated in the figure, it is preferred that a predetermined amount of time expires prior to exiting hot mode even where the fluid temperature has dropped below the temperature at which hot mode was invoked. The various relationships between the rates of fluid temperature increase and fluid temperature are preferably empirically determined and stored as calibration tables in the powertrain control unit.

In addition to the hot mode management as just described, it may be desirable to provide for an adaptive feature effective to supplement the calibration. Taking trace 201 again for exposition, it may be that hot mode would be entered at a point on the trace that results in an undershoot of the maximum desired temperature Tmax. This point is labeled PsU and the resultant path of fluid temperature is labeled 201U. It can be seen that the peak fluid temperature of path 201U is below Tmax by an amount PKu. PKu represent a peak fluid temperature error relative to the maximum desired fluid temperature Tmax. As previously mentioned, this error represents desirable opportunity for reducing the amount of time spent in hot mode by delaying entry therein. Similarly, it may be that hot mode would be entered at a point PsO on the trace that results in an overshoot of the maximum desired temperature Tmax by an amount labeled PKo which represents the peak fluid temperature error relative to Tmax. With these two general cases illustrated, it is desirable to provide for an adaptive feature to drive the peak fluid temperature errors to zero.

Figure 3A:
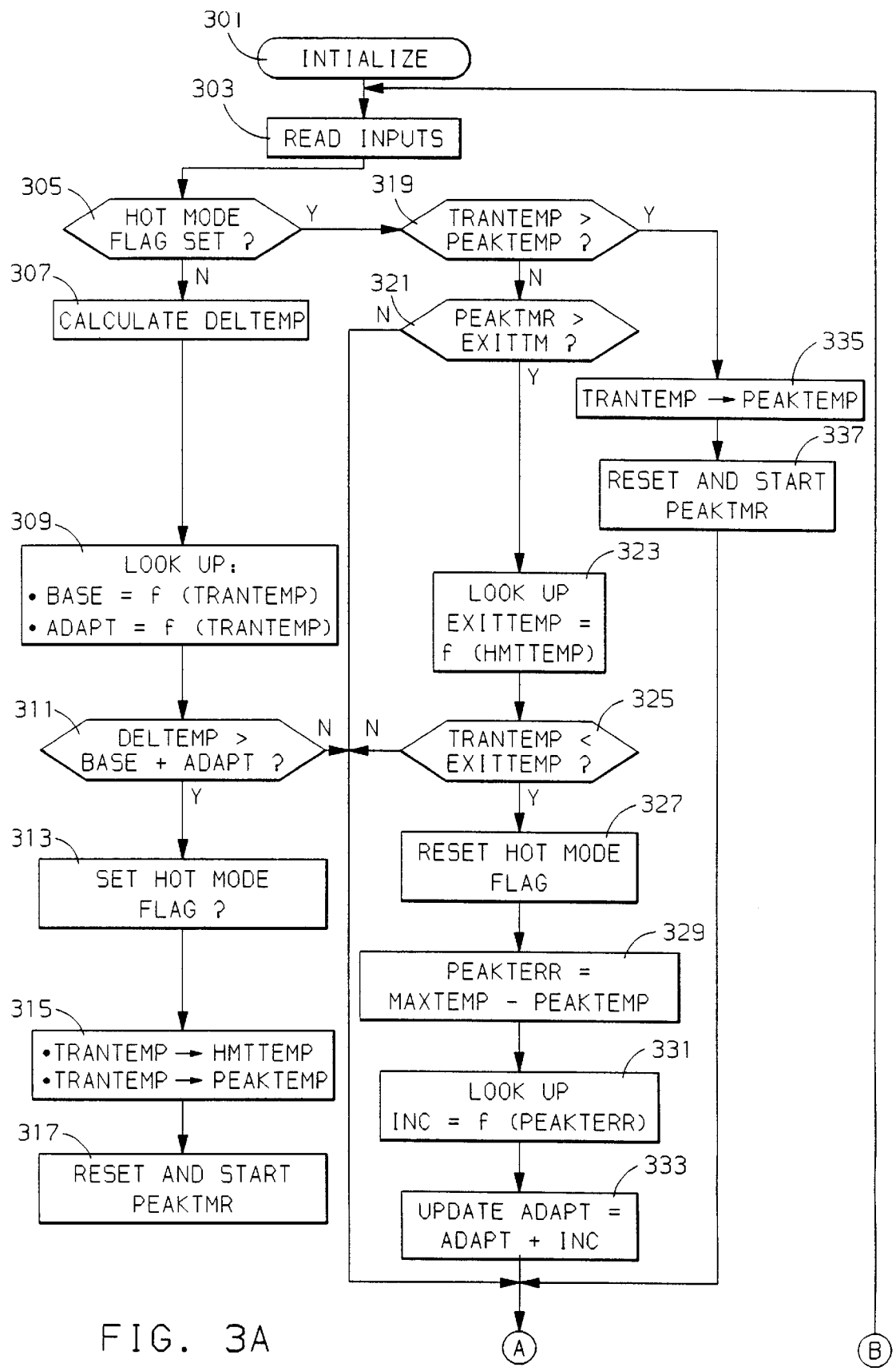
FIGS. 3A and 3B illustrate various flow diagrams representing computer instruction sets executed by a powertrain control unit as illustrated in FIG. 1 for carrying out the hot mode management of the present invention. illustrates powertrain.
Figure 3B:
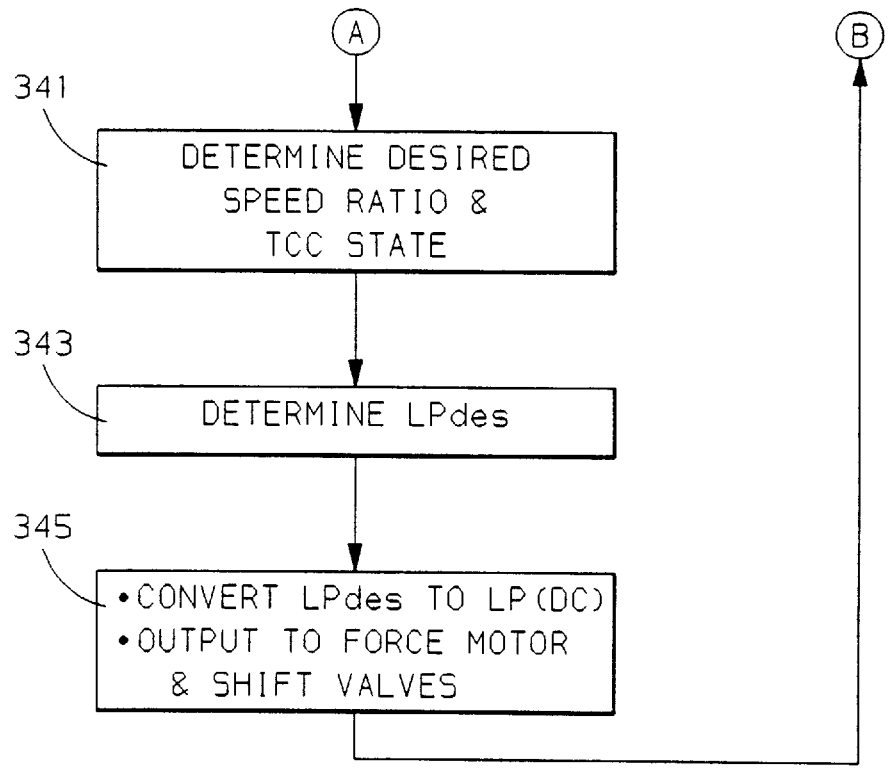

Turning now to FIGS. 3A and 3B, a set of program steps for execution by a powertrain control unit as shown in FIG. 1 to carry out the hot mode management method of the present invention are shown. The instruction set represented by the flow diagram may be part of a much larger set of instructions executed by the powertrain control unit to control, monitor and diagnose various functions of the engine and transmission as well known to those skilled in the art. The present set of instructions illustrated in FIGS. 3A and 3B therefore represent only those instructions and steps germane to present invention.

Beginning first at block 301, program instructions are executed at the beginning of each period of vehicle operation for initializing various tables, timers, pointers etc. used in carrying out the control functions of the invention. Following such initialization, instruction blocks 303–345 are repeatedly executed as designated by the flow diagram. Blocks 305–337, as a group, correspond to steps executed in the determination of the propriety of invoking a hot mode of operation as previously described. The remaining steps 341–345 represent ancillary steps for implementation of the mode determination in the preceding steps in a well known manner. Block 303 reads and conditions various input signals applied to the powertrain control unit 42 via lines 46–56.

Block 305 checks to see if hot mode is currently active vis-a-vis a hot mode flag in the current example or some other determinant. If hot mode is not currently active, blocks 307-317 are executed to check entry conditions and to initialize variables for use in a hot mode exit routine and an adaptive correction routine as previously described. If, on the other hand, hot mode is currently active, blocks 319–337 are executed to perform an exit and adaptive routine.

Assuming initially that hot mode is not currently active, block 307 is executed to calculate a change in fluid temperature (DELTEMP). Essentially, the difference between a current and previous fluid temperature readings and appropriate filtering is used to establish DELTEMP. Block 309 then accesses a pair of tables to retrieve therefrom values used in the determination of the propriety of entering hot mode based upon the current conditions. First, a calibration constant term (BASE) is looked up as a finction of the current fluid temperature (TRANTEMP). Next, an adaptive term (ADAPT) is looked up, also as a function of TRANTEMP. Block 311 performs a comparison DELTEMP to the summation of the BASE and ADAPT, which summation represents the maximum acceptable change in fluid temperature for present fluid temperature conditions. If DELTEMP does not exceed BASE plus ADAPT, the remaining blocks 313–317 are bypassed in favor of execution of the mode implementation blocks 341–345, and the transmission mode remains something other than hot mode. If, however, DELTEMP is in excess of the summation of BASE and ADAPT, hot mode invocation is desirable and block 313 sets the hot mode flag. Block 315 next saves the present fluid temperature TRANTEMP to a hot mode entry fluid temperature variable HMTTEMP and to a peak temperature variable PEAKTEMP. Thereafter at block 317, an exit timer PEAKTMR is initialized and the mode implementation blocks 341–345 are executed.

If hot mode is currently active, block 305 is answered in the affirmative and blocks 319–337 may be executed. Block 319 together with blocks 335–337 serves to update the peak fluid temperature variable PEAKTEMP in the event that the present fluid temp TRANTEMP is in excess thereof. PEAKTEMP, therefore, keeps a running record of the highest fluid temperature experienced during the presently active hot mode. Additionally, upon each PEAKTEMP update, the exit timer PEAKTMR is once again initialized. For so long as the present fluid temperature TRANTEMP continues to ascend, hot mode exit and adaptive blocks 321–333 are bypassed in favor of the execution of blocks 335–337. Thereafter, mode implementation blocks 341–345 are executed.

Assuming that fluid temperature has ceased its ascendancy, then block 319 is answered in the negative and execution of exit and adaptive blocks 321–333 is commenced. Block 321 first determines if sufficient time has elapsed since the fluid temperature reached a peak value to justify potential exit out of hot mode. Here, PEAKTMR is compared with a predetermined value (EXITTM), which if not exceeded results in bypassing further exit conditional checks and adaptive steps at blocks 323–333 and passes processing to the mode implementation blocks 341–345.

Where the value of PEAKTMR exceeds EXITTM, an exit temperature threshold (EXITTEMP) is looked-up in a table of calibrated values as a function of the previously stored hot mode entry fluid temperature HMTTEMP at block 323. The current fluid temperature TRANTEMP is then compared against EXITTEMP, and if TRANTEMP is less than EXITTEMP then blocks 327–333 are next executed. If, however, the threshold EXITTEMP is not crossed then those blocks are bypassed and mode implementation blocks 341–345 are executed.

At block 327, the hot mode flag is reset such that hot mode will be exited during the mode implementation steps to follow. Blocks 329–333 are then sequentially executed to update the adaptive term ADAPT. First, the peak temperature error relative to the calibrated maximum desired temperature MAXTEMP is calculated using MAXTEMP and PEAKTEMP at block 329. A look-up is performed at block 331 to establish an incrementing value (INC) for ADAPT. INC is a signed value which is negative for negative peak errors (overshoot) and positive for positive peak errors (undershoot). Block 333 then applies the incrementing value to the present value of ADAPT additively, thereby increasing or decreasing ADAPT by INC and saving the result in the corresponding table. Blocks 341–345 are then executed to establish the presently desired mode.

Referring now to blocks 341–345 of FIG. 3B, block 341 determines the desired speed ratio and TCC state in conventional manners in accordance with the desired mode. Of course if the desired mode is hot mode as indicated by the setting of the hot mode flag, hot mode shift patterns and TCC application are invoked. Block 343 performs the steps necessary to determine desired line pressure LPdes and friction device fluid pressure in accordance with the current desired mode. Block 345 is finally executed to convert the desired line pressure LPdes to a solenoid duty cycles LP(DC), and to output the duty cycle and discrete solenoid states to the shift valves on lines 57 as conventionally practiced in the art.

I claim:

1. A method for controlling entry into a hot mode of operation in an automatic transmission including a plurality of fluid operated friction elements, a fluidic torque converter and a fluid operated torque converter lock-up clutch, the method comprising the steps:

monitoring a transmission fluid temperature;

calculating a rate of fluid temperature change from said monitored transmission fluid temperature;

comparing said rate of fluid temperature change to a reference rate of fluid temperature change determined as a function of said monitored transmission fluid temperature; and invoking said hot mode of operation when said rate of fluid temperature change exceeds said reference rate of fluid temperature change.

2. A method as claimed in claim 1 further comprising the steps:

exiting said hot mode of operation when the monitored fluid temperature falls below an exit temperature determined as a function of the monitored fluid temperature at which the hot mode of operation was invoked.

3. A method for controlling entry into a hot mode of operation in an automatic transmission as claimed in claim 1 further comprising the step:

adjusting said reference rate of fluid temperature change in response to a temperature differential between a peak fluid temperature during said hot mode of operation and a predetermined maximum desirable fluid temperature.

4. A method for controlling entry into a hot mode of operation in an automatic transmission including a plurality of fluid operated friction elements, a fluidic torque converter and a fluid operated torque converter lock-up clutch, the method comprising the steps:

monitoring a transmission fluid temperature;

calculating a rate of fluid temperature change from said monitored transmission fluid temperature;

comparing said rate of fluid temperature change to a predetermined reference rate of fluid temperature change adjusted in response to a temperature differential between a peak fluid temperature during said hot mode of operation and a predetermined maximum desirable fluid temperature; and invoking said hot mode of transmission operation when said rate of fluid temperature change exceeds said reference rate of fluid temperature change.

5. A method as claimed in claim 4 further comprising the steps:

exiting said hot mode of operation when the monitored fluid temperature falls below an exit temperature determined as a function of the monitored fluid temperature at which the hot mode of operation was invoked.

6. A method as claimed in claim 4 wherein said predetermined reference rate of fluid temperature change is determined as a function of said monitored transmission fluid temperature.

* * * * *